March 31, 1964   J. C. QUAYLE   3,127,140
PREFORMED LINE TIE
Filed March 19, 1962
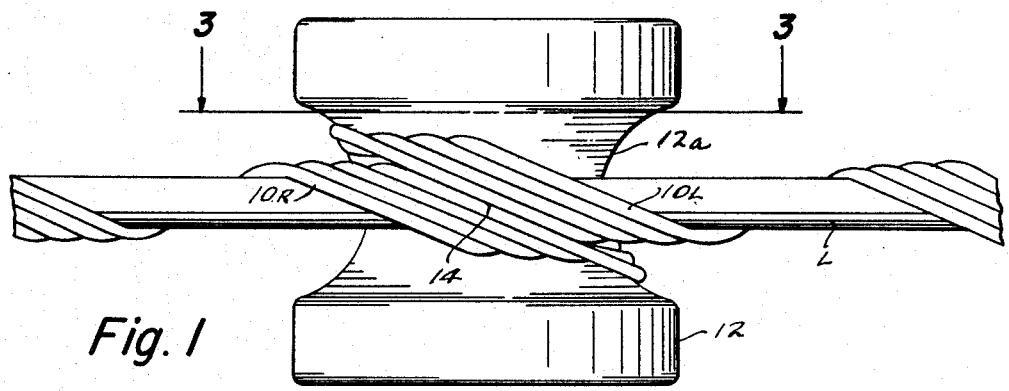
Fig. 1
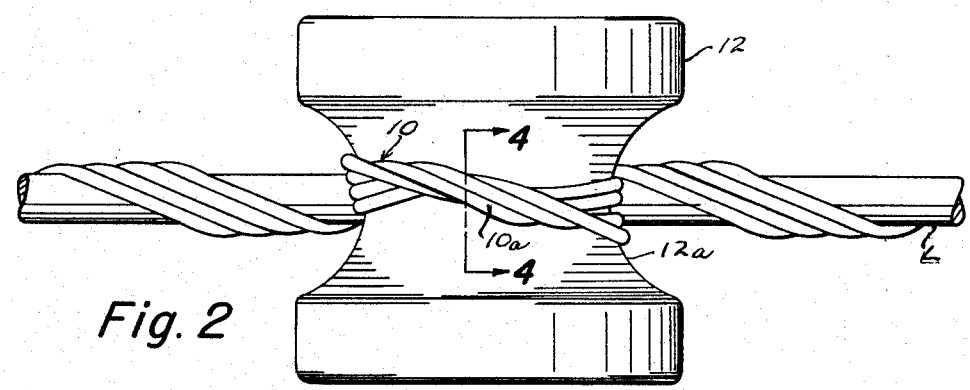
Fig. 2
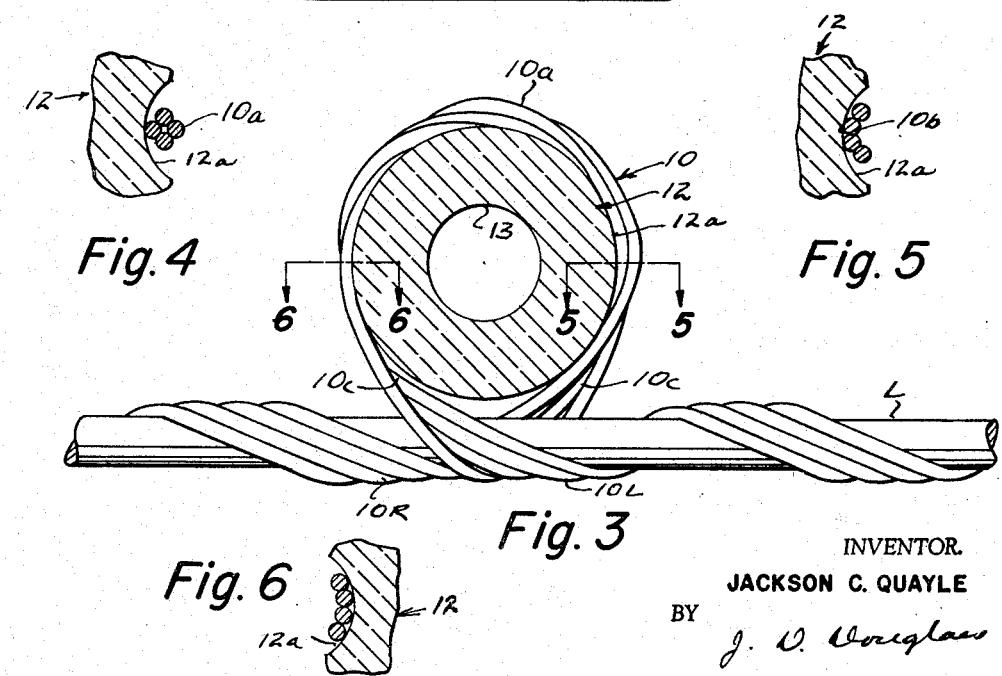
Fig. 4   Fig. 5
Fig. 3
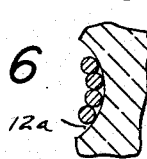
Fig. 6
INVENTOR.
JACKSON C. QUAYLE
BY J. D. Douglas
his ATTORNEY

United States Patent Office 3,127,140
Patented Mar. 31, 1964

3,127,140
PREFORMED LINE TIE
Jackson C. Quayle, 10225 Darrow Road, Twinsburg, Ohio
Filed Mar. 19, 1962, Ser. No. 180,648
4 Claims. (Cl. 248—63)

This invention relates to means for securing a wire strand or cable to a support and more particularly to a preformed line tie.

As is well known to those versed in the art, various types of long lines are usually supported at spaced points. Such points may be poles, or supports at spaced points along a building or the like. The lines to be supported may be of any type including electrical transmission or distribution lines, telephone lines, etc. These lines may be single wires or they may be cables made up of a multiplicity of wires, conductors, strands or cables. The wires may be bare or insulated. Also included are certain types of power lines known as "duplex," "triplex," "quadraplex," service drop cables, or service entrance cables, these being usually one or more "hot" wires combined with a ground wire which may also serve as a messenger for the hot wires, or they may be included as a unitary cable type of construction.

It has been most common practice to secure these lines to insulators or supports, which may be carried by the pole or other structure with the insulators extending vertically, horizontally or at an angle and where the lines extend tangent to the body of the insulator or support in contact therewith and are held in place by tie wires which are hand-wrapped around the insulator or support and around the line.

These wires had to be made of a soft non-resilient material in order that they could be wrapped around the insulator and the line.

It has also been proposed to use certain types of preformed ties, such as shown in FIG. 7 of Selquist Patent No. 2,202,538, where a pair of helices are connected together by a straight annealed part arranged to be bent around the insulator.

All of the means for securing the line to the support have several disadvantages. The wire, if insulated, in time has the insulation worn off by the continual rubbing contact with the insulator or support. Since the wire is secured at the insulator or support, the vibration of the wire causes it to move and bend adjacent the place where it is tied, and this bending movement causes the wire to become fatigued and eventually to break at that point.

Securing of a wire to an insulator by the commonly known methods is time consuming and takes considerable skill. The character of the fastening will vary with the ability of the different workmen. Where single tie wires are used, and the line is an insulated line, and particularly where the insulation is made of one of the modern plastics, the pressure of the tie wire on the insulation causes a cold flow of the plastic and eventually the tie wires may come into contact with the current carrying inner wire and the insulation value at that point is lost.

Heretofore various means have been proposed to eliminate the above problems. Some of the devices included metallic supports which cradle the wire and which supports are in turn connected to the insulator or support. Others contemplated guards made of wire rods preformed into helical formation, known as armor rods, which are wrapped around the wire to enclose it. The enclosed wire is in turn supported by a suitable fixture or tied directly to the support. The guards assist in preventing the breakdown due to vibration but take longer to apply because they must first be applied over the wire and then the support or tie means must still be secured over the wire guards. They all hold the wire or the wire and its armoring tightly against the insulator.

Throughout this specification the words "insulator" and "supports" are used interchangeably, and are not intended as a limitation.

The present invention contemplates the provision of a spring loaded line tie and guard all in one element which may be applied to the insulator or support and the line quickly and easily by a workman having ordinary skill and with a minimum of or no tools. By providing the tie and guard of the present invention, the need for the use of the intermediate armor rods formerly used between the tie and the wire to protect against chafing of the tie against the conductor and/or the wire and the insulator is eliminated. It is versatile in that it can be used to tie cables and lines of various diameters to various types of supports or insulators, which may be of the spool type, or any other kind in common use in the industry. It will be noted that supports, such as insulators as used in the industry, have been standardized as to shape and dimensions, and hence, make it practical to design a preformed line tie and guard. It can be used on bare or insulated wire and performs a multiple function for being a tie for tying the line to the insulator; a guard for holding the wire against bending at the point of support, and, a means for damping of vibrations in the wire itself.

Still other advantages of the invention, as well as the invention itself, will became more apparent from the following description of an embodiment thereof, which description is illustrated by the accompanying drawings and forms a part of this specification.

In the drawings:

FIG. 1 is a front elevational view of an insulator with a line tied thereto by the tie of the invention;

FIG. 2 is a rear elevational view thereof;

FIG. 3 is a section on the line 3—3 of FIG. 1;

FIG. 4 is a section on the line 4—4 of FIG. 2;

FIG. 5 is a section on the line 5—5 of FIG. 3; and

FIG. 6 is a section on the line 6—6 of FIG. 3.

In the drawings, like parts have been designated by like reference characters.

Briefly, my invention contemplates the use of a preformed helical wire of open pitch such that it may be applied to a line without permanent deformation and of a diameter such that it grips the line, which wire is provided with a bight that surrounds the insulator and legs that cross over and extend in opposite directions from the bight and which are wrapped around the line. The line is thus resiliently tied to the insulator and at the same time it is held away from the insulator and cannot touch it.

More specifically the device is first formed by preforming wires, preferably of hard resilient material, into an open helix having an open pitch such that the wires may be applied to a line from the side and wrapped around the line without permanent deformation. The inner diameter of the helix is normally such that it is slightly less than the outside diameter of the line and when applied to the line, in the manner above stated, grips the line securely. Such a structure is well known in the prior art, as shown in Ruhlman Patent No. 2,947,504, in FIGS. 1 to 4 inclusive. The wire so formed may also be applied to a line having a sleeve over the line if desired.

It should be understood that the word "line" is used in its generic sense and can include a single wire, cable, conductor or a combination of wires as previously noted. These wires or lines may all be insulated, all bare, or part of them bare and part of them insulated. For instance, in the case of triplex, one of the wires may be bare and twisted with a pair of other wires which are insulated, the bare wire being the ground potential wire and also serving as a messenger and the other wires carrying the high voltage.

The above helices are preferably assembled into groups in contiguous relation to each other as they would be placed upon a line in such a manner that the convolutions of the adjacent wires were juxtaposed to convolutions of each other wire to provide what is known as a partial lay. In the drawings four such wires are illustrated. It is apparent that the number of wires may be varied and that a single wire may be used. When the wires are to be used in conjunction with a stranded line it is preferred that the direction of the pitch be the same as that of the line, although it could be in the opposite direction, and that the pitch length be less than that of the line. The inner diameter of the helices should also be less than that of the line and sufficiently smaller to enable the wires, when installed on the line, to grip the line. It will be appreciated, however, that in some instances, it may be desirable that the inner diameters of the helices be slightly larger than the line so that the line may move longitudinally therethrough. When they are used with an insulated line the inner diameter of the helices should not be so small that they engage the line too tightly and thus cause undue cold flow of the insulation material on the line.

The wires are first formed into helices as stated. They are then assembled to provide a partial lay. When so assembled they are sprayed with a suitable adhesive to provide a coating which holds the wires in the assembled relation to each other when the coating dries. Before the adhesive dries, an abrasive, such as silica sand, may be dusted on the inner sides of the helices to provide an increase in the holding power of the wires with the line.

The so assembled lay which may now be considered as a unitary element is bent into a hairpin formation in a manner similar to that shown in FIG. 10 of my Patent No. 3,018,319, or FIG. 5 of the Ruhlman patent supra, except that the two legs preferably cross over. For shipping purposes the legs may be secured together by a short length of tape.

At the initial formation of the partial lay into a hairpin shape to provide two legs and a bight 10, it is preferable that the curvature of the bight portion be 180° and have the same radius as that of the support to which it is to be attached. This causes a slight deformation of the partial lay at the apex of the bight 10 wherein the separate wires move toward each other and toward a closed formation 10a, as illustrated in FIG. 4.

The workman receives the assembled unit and removes the tape to free the legs. He then passes the bight 10 of the unit around the support, which is shown in the drawings as a conventional spool type insulator 12 having an axial opening 13 through which a suitable support secured to a pole, a building or other object, may extend. The legs are pulled tightly to cause the bight to extend into close engagement with the necked-in body 12a of the insulator and with one of the legs extending under and the other extending over the line L. This operation is assisted by performing the bight and due to the fact that the legs extend outwardly a substantial distance prior to installation and, when grasped in the hands, act as levers enabling the bight to be pulled tighter and eventually causing the wires of the partial lay at the apex of the bight, to all be pulled together into a symmetrical group, as illustrated in FIG. 4.

As shown in the drawings, the left side of the bight and its leg 10L pass over the line L and is wrapped about the line to the right of the insulator. Then the leg from the right side of the bight 10R is pulled under the line and is wrapped around the line to the left of the insulator. Obviously both legs could be, and preferably are, grasped by the hands and wrapped around the line in opposite directions.

The pitch and length of the helices is preferably predetermined so that there is a zone along the bight opposite to the cross over point that becomes a full or hard twisted portion such as in FIG. 4. On each side of that zone, the wires return to their predetermined partial lay formation such that at 5—5 and 6—6 they are contiguous to each other in their original undistorted formation which is in the form of a semi-circle as shown in FIG. 5. The inner wires at these particular points 10b being in tangential engagement with the surface of the insulator as considered in a vertical direction. That is, the partial lay is tangential to the insulator in all directions at this point.

The shape of the wires is thus such that they extend outwardly and away from the insulator at 10c (FIG. 3) and the line is engaged by the inner surface of the helix of each of the legs. This is at a point spaced away from the insulator with the half lay acting as a socket which engages the line. The line cannot move into contact with the insulator because the convex sides of the partial lay legs are against the side of the insulator at points 10b as previously described and the tangential engagement is for a distance starting before and ending after a midline through the insulator and parallel to the line.

It can be seen from FIG. 1 that the legs, where they cross over the line from opposite directions, have the adjacent marginal portions of the partial legs in contact with each other at 14. This prevents the legs from shifting relative to each other after attachment to the line and prevents the bight from being closed to such an extent that the line would be pulled into contact with the insulator. There are thus forces acting on the legs, namely a force where the portions of the bight portion to the cross-over and extending from the point of tangency of the partial lay with the insulator and the point where the lay curls over and engages the line, tending to force the legs to an open position, and a resistance to this force which includes the clamping of the line by the partial lay as well as the contact of the lay legs with each other diametrically opposite the center of the insulator at 14 which results in the legs at 10c being pulled toward each other and the line being resiliently suspended and at the same time held away from the insulator. In addition to the above, the engagement of the partial legs with the line, provides a protection for the line against bending at the points of support.

As stated, the wires at the point 10b are in engagement with the insulator. They may take the formation as shown in FIG. 5, where they are of normal tightness or the position shown in FIG. 6, where the legs have been pulled slightly tighter. It is also pointed out that the abrasive grip enhancing material may only be applied to the legs and omitted from the bight portion.

It is apparent that the partial lay in engagement with the line enables the gripping pressure on the line to be distributed over a larger area and thus less damage is done to the line or to the insulation. It is also pointed out that the device of the invention may also be provided with a coating of plastic which further protects not only the lay itself but the insulation and the line both electrically and mechanically.

The diameter of the bight and the pitch of the lay are correlated to cause the line to be positioned away from the support or insulator. The length of the legs may vary, longer legs supporting the line for a greater distance from opposite sides of the insulator. The diameter of the helices will also be determined by the size of the line which is to be tied. For instance in lines where there are two or more discrete elements such as "duplex," "triplex," etc., the diameter of the helix could be such that all of the elements are encompassed, and, if a split guard as is in common use, was used over the line, it could also embrace it. It is also apparent that the device may also be used for tying lines to cable spacers which are used for holding lines in spaced relation to each other.

When a single wire is used, since it is a hard drawn resilient helical member throughout its entire length, it will be apparent that the individual convolutions of the helix in the bight engage with the support at points tangent to the support and that the portions of the helices between the points of engagement provide a spring loaded resiliency for these points as well as for the legs which extend around the line. Thus the line is resiliently held away from the support and the stress in the legs is transmitted to the portions of the bight where they extend from the insulator to provide a spring loading of the bight on the insulator as well as of the legs.

It will also be appreciated that the tie and guard can be in the form of a helix having the same general configuration as the partial lay but formed from a single strip of plastic, metal, or reinforced plastic of substantially rectangular cross section, and would operate in substantially the same manner as the partial lay.

Having thus described my invention, in an embodiment thereof, I am aware that numerous and extensive departures may be made therefrom without departing from the spirit or scope of the invention as defined in the appended claims.

I claim:

1. In combination with a support and a line, a preformed line tie and guard securing said line to the support and comprising a plurality of rods of hard drawn resilient material having a diameter less than that of the line formed into open helices with a pitch and applied to the line without permanent deformation thereof, said helices having an inner diameter for the helices, in less than that of the line prior to installation on the line, in gripping engagement with the line, said rods being assembled into groups to provide a partial lay and being bent intermediate their ends to provide a bight portion, said bight being in surrounding relation to the support and being distorted at the apex of the bight to provide a close twisted portion in contact with the support for a substantial distance on opposite sides of the apex of the bight and partial lay portions on opposite sides of said close twisted portion with said partial lay portions having contact with the support on opposite sides of the twisted portion and said portions beyond said last-mentioned portions extending tangentially away and free from said support and one of the partial lay portions extending over the line and the free end being wrapped around the line and extending in engagement therewith and in one direction and the other of said partial lay portions extending under the line and being wrapped around the line and extending in the other direction, said close twisted portion and said partial lay portions in contact with the support providing a resilient spring tension on the parts that extend free of the support and holding them away from the support.

2. In combination with a support and a line, a preformed line tie and guard securing said line to the support and comprised of a partial lay of resilient hard drawn wires each having a thickness less than that of the line, each of which is formed into an open helix of a pitch such that they are engaged with the line without permanent deformation of the lay and internal diameter of the helix, said lay being formed with a bight intermediate its ends and a pair of leg portions, said bight passing around the support, and the legs extending in opposition to each other on opposite sides of the support, the convex side of each of the lay portions in the bight being in engagement with the support on opposite sides thereof and portions of said bight on opposite sides extending outwardly spaced away and free from the support and then crossing over each other spaced from the support with one leg of said lay portion extending over the line and the other leg under the line and with the end portions being wrapped around the line and extending in opposite directions, said portions at the point where they cross over engaging and holding said line resiliently spaced away from the support.

3. In combination with a support and a line, a preformed line tie and guard securing the line to the support in resiliently spaced relation thereto and comprising a plurality of rods of hard drawn resilient material each having a diameter less than that of the line to which they are applied and formed into open helices with a pitch and applied to the line without permanent deformation and an inner diameter for the helices, less than that of the line prior to installation on the line, in gripping engagement with the line, said rods being assembled into groups to provide a partial lay and being bent intermediate their ends to provide a bight portion, said bight having an apex portion in contact with the support and partial lay portions on opposite sides of the apex with said partial lay portions having contact with the support on opposite sides of the support and other portions beyond said last-mentioned portions extending tangentially away outwardly free and spaced from said support and then one of the partial lay portions extending over the line and the free end being wrapped around the line in engagement therewith and the other of said partial lay portions extending under the line and across said other side of the line in engagement therewith, said portions which extend over and under the line meeting with each other in longitudinal engagement diametrically opposite and spaced from the support and in supporting engagement with the line, said apex and said partial lay portions in contact with the support providing a resilient spring tension on the parts extending away and free from the support and holding them and the line resiliently away from the support.

4. In combination with a support and a line, a preformed line tie and guard securing the line to the support and comprising a plurality of rods of hard drawn resilient material having a diameter less than that of the line to which they are applied and formed into open helices with a pitch and applied to the line without permanent deformation and an inner diameter for the helices less than that of the line prior to installation on the line and gripping the line, said rods being assembled into groups to provide a partial lay and being bent intermediate their ends to provide a bight portion, said bight having an apex portion in contact with the support, and, providing partial lay portions on opposite sides of the apex with said partial lay portions having contact with the support on opposite sides of the support and said portions beyond said last-mentioned portions extending tangentially away and free from said support and one of the partial lay portions extending over the line and the free end being wrapped around the line in engagement therewith and the other of said partial lay portions extending under the line and across said other side of the line in engagement therewith, said portions which extend over and under the line meeting with each other in longitudinal engagement diametrically opposite the support, said apex and said partial lay portions in contact with the support providing a resilient spring tension on the parts extending away and free from the support and holding them resiliently away from the support, the apex of the bight being distorted to provide a close twisted portion in contact with the support.

References Cited in the file of this patent

UNITED STATES PATENTS

| | | |
|---|---|---|
| 2,202,538 | Selquist | May 28, 1940 |
| 2,943,135 | Bertling | June 28, 1960 |
| 2,947,504 | Ruhlman | Aug. 2, 1960 |
| 3,069,491 | Hayden et al. | Dec. 18, 1962 |